Jan. 19, 1932.   W. E. GREENAWALT   1,841,438
COPPER EXTRACTION PROCESS
Filed Feb. 11, 1927
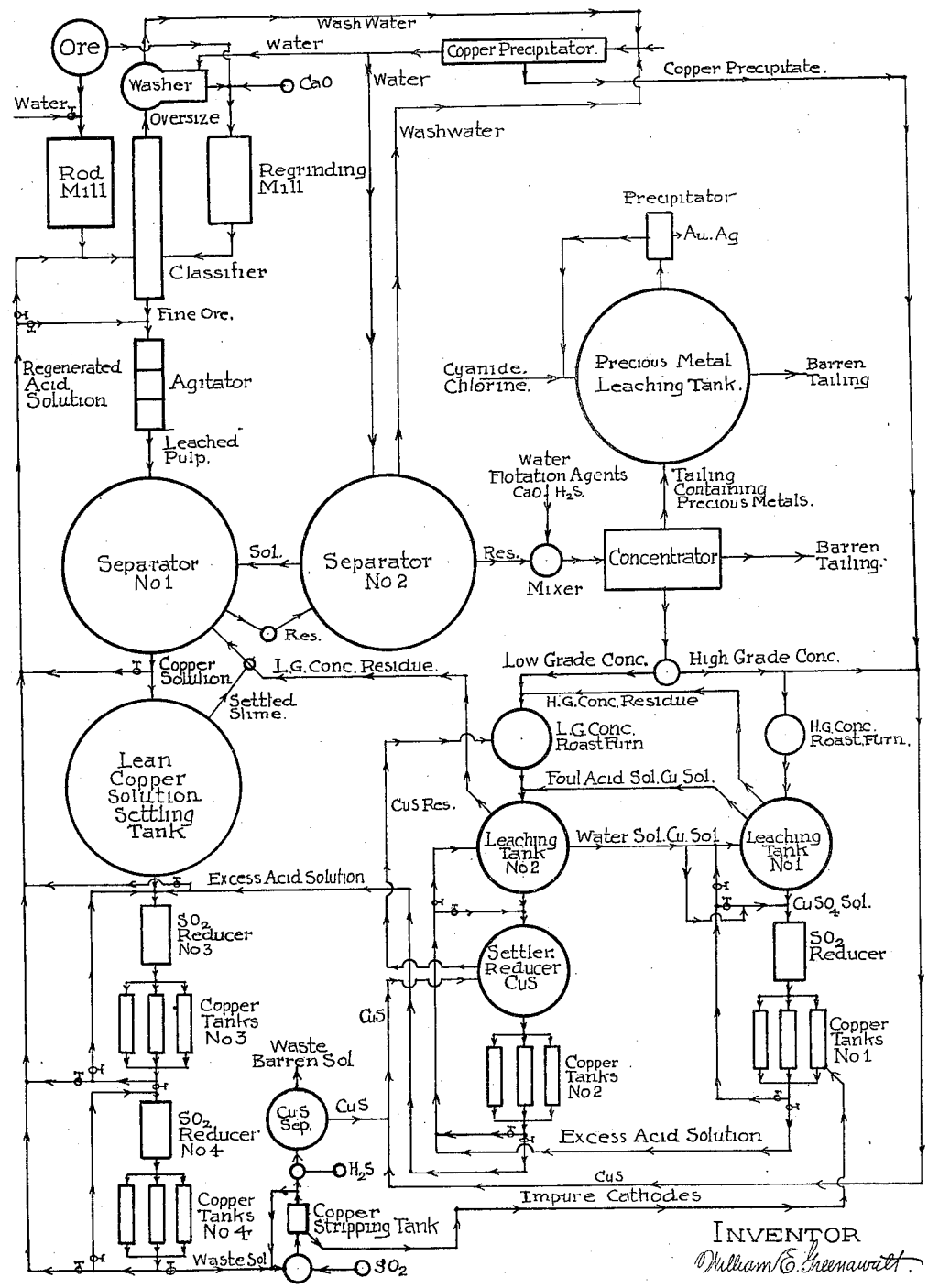
INVENTOR
William E. Greenawalt Patented Jan. 19, 1932

1,841,438

UNITED STATES PATENT OFFICE

WILLIAM E. GREENAWALT, OF DENVER, COLORADO

COPPER EXTRACTION PROCESS

Application filed February 11, 1927. Serial No. 167,544.

The process relates particularly to the treatment of mixed oxide (including carbonate and silicate) and sulphide copper ores. It has as its object the production of electrolytic copper from such ores without resorting to regular smelting and refining methods, which in most mining districts, are too expensive for general adoption, especially in small or medium sized units.

The economical treatment of mixed oxide and sulphide copper ore presents rather a difficult problem. Methods which are applicable for the extraction of the oxidized copper are not satisfactory for the extraction of the sulphide copper.

The usual methods of treating mixed oxide and sulphide copper ore are, first; by concentrating the ore to separate a sulphide concentrate and an oxidized tailing, smelting the concentrate, and leaching the tailing with dilute sulphuric acid and precipitating the copper from the leach solution with metallic iron, second; by leaching the rather coarsely dry crushed ore with dilute sulphuric acid, then regrinding the leached ore and subjecting it to flotation to recover the sulphides; third; by the addition of a sulphidizing agent to the finely ground ore and floating the oxides and sulphides together, fourth; by leaching the rather coarsely dry crushed ore with an acid ferric salt solution to extract both the oxidized and sulphide copper and precipitating the copper from the resulting solution electrolytically with the regeneration of acid and ferric iron.

The first of these methods involves the loss of the acid for leaching and the iron for precipitation, excessive dilution of the solutions, and the separate treatment by smelting of both the sulphide copper and the copper precipitate. In the second method a double treatment is necessary, involving dry grinding for leaching and wet grinding for flotation, and also the separate treatment by smelting of the concentrate and the precipitate. The third method has been tried for many years, but apparently the sulphidizing of the oxidized copper minerals so as to float them with the sulphide minerals, has not met with the encouragement that was at one time hoped for. The fourth method has the advantage that the oxidized and sulphide copper can be extracted with the acid ferric salt solution, but it labors under the disadvantage that the oxidized copper is quickly dissolved while extremely prolonged time is necessary to adequately extract the sulphide copper, and the regeneration of the ferric iron during the electrolytic deposition of the copper, implies a low current efficiency, or diaphragm complications, and usually also heating of the solution. Then, too, the process is practically limited in its application to mixed ore in which the sulphide copper occurs as chalcocite, since the action of ferric iron on chalcopyrite or bornite is too slow to offer promising possibilities.

In the present process some of these difficulties are overcome and others are minimized, so that it is possible and practical to extract the copper in its oxide and sulphide combinations by a continuous process at no extra acid expense, and to obtain all of the copper as the electrolytic metal. This process may be considered as an improvement on that described in my Patent No. 1,614,668, Jan. 18, 1927, and on my pending application, Serial No. 147,324, Nov. 9, 1926.

In describing the process reference may be made to the accompanying drawing, which is a flow sheet of the process in diagrammatic plan.

The ore as it comes from the mine may be crushed dry, as usual, to the desired fineness for the wet fine grinding machine. Wet grinding is preferred to dry grinding. A rod mill is preferred for wet fine grinding, for the reason that less water is required and there is a smaller amount of oversize or circulating load in a rod mill than in other forms of wet fine grinding machines. Results closely approximating the maximum efficiency of the rod mill, are obtainable with about 25% water in the charge, and with about 25% oversize, when grinding to about 48 mesh, which may be considered the fineness desired for subsequent flotation.

The dry crushed ore is fed to the rod mill, with about 25% water to give the pulp the proper consistency for economical fine grinding, while at the same time keeping the water down to a minimum, desirable for subsequent steps in the general treatment. The ore pulp, containing about 25% water, as it flows from the rod mill, is mixed with dilute acid solution and flows into the classifier, for the desired classification. For convenience, a ton unit may be considered for descriptive purposes. A ton of ore, with 25% water, flows into the rod mill and issues as finely ground wet pulp. The wet pulp is then mixed with about 3.25 tons of acid solution, which, with the water for grinding, will give about 3.5 tons of dilute acid solution per ton of ore, and this will give about the right consistency for classification to 48 mesh, which it may be assumed is the fineness of grinding desired.

The classification is made as usual, except that it is made with a dilute acid solution instead of with water, and that the classifier is made of acid proof material. Various classifiers have long been used for agitation in connection with acid leaching, and offer no difficulty, either of construction or operation. The ore ground to the desired fineness—48 mesh—will overflow from the classifier into the agitator, but while the acid pulp is being classified, the copper is being rapidly leached and brought into solution. As in all leaching processes, the first action of the acid on the finely ground ore is very quick, and most of the oxidized copper will go into solution in the classifier. The acid will also be largely neutralized in the classifier. The oversize— about 25% or 500 pounds per ton of ore—is separated from the 48 mesh material, and is delivered to the washer, where the excess acid and soluble copper are washed from the oversize, or put in a harmless condition for regrinding. If desired, some of the acid and soluble copper can be washed out of the oversize in the classifier, before the oversize is delivered to the washer, provided the very slight dilution of the acid solution by a very slight washing process in the classifier is not objectionable. In some cases it will not be objectionable. The washed oversize, or the oversize treated to make the excess acid and the soluble copper harmless for regrinding, is then introduced into the regrinding mill. The washed oversize will contain just about enough water for regrinding, but if necessary a little more water may be added to bring it to the 25% desired. The reground pulp, containing 25% water, flows into the classifier and is classified with the new ore in the acid solution, and is also given further acid treatment at the same time for dissolving more copper. The oversize from the classifier is returned to the regrinding mill and the operation is repeated indefinitely. The washwater resulting from washing the oversize will contain a little acid and a little soluble copper. The acid and the soluble copper may be neutralized with any convenient neutralizing agent, such as caustic lime, or the washwater may be circulated through a copper precipitator containing a precipitant for the copper, such as metallic iron, dilute alkali solution, or finely ground limestone. The neutral and barren solution may be returned to the washer and reused. Fresh water may be added as desired. The copper precipitate may be redissolved in the regular operation of the process and converted into the electrolytic metal.

The grinding operation of the process can better be described in more detail and its advantages made clearer by assuming a ton of ore containing, say, 0.75% extractable oxidized copper and 0.75% extractable sulphide copper. The spent acid solution in the classifier may be assumed as having 1.0% free acid in the oversize, and that the acid solution in the oversize will be from 15% to 20% of the weight of the oversize. If there are 500 pounds of oversize, containing 20%, or 100 pounds, of 1.0% acid solution, there will be 1.0 pound of acid in the solution which will have to be neutralized or made harmless for regrinding, if the oversize is not washed at all in the classifier. If the oversize in the classifier is only slightly washed to displace a portion of the acid solution, the acid in the classifier washed oversize should easily be reduced to about 0.5 pound, per ton of ore ground in the rod mill. This slightly washed oversize from the classifier can then be easily rewashed in the washer to remove practically all of the acid, or a very small amount of lime added to the rewashed oversize, will make it entirely harmless for regrinding at an expense which is practically negligible.

The soluble copper in the oversize also has to be taken care of, for the reason that soluble copper would combine with the iron of the regrinding mill, and while this would not be large in any case, it would be undesirable. A small amount of acid or a small amount of soluble copper in the regrinding mill, mixed with a relatively large amount of ore, largely as mud, will not be as harmful as the same amount of acid or soluble copper in a clear solution. Nevertheless, this is a factor of safety in the process, and it is desirable to neutralize both the acid and the soluble copper before the oversize enters the regrinding mill. Fresh ore added to the oversize for the regrinding mill will also tend to very quickly neutralize a very small amount of acid and soluble copper, since all copper ores contain some lime and other acid consuming constituents.

If the 15 pounds of soluble copper, per ton of ore, is all extracted in the classifier with 3.25 tons of undiluted solution, the resulting copper solution would contain about 4.6 pounds of copper per ton of solution, and if this is diluted with the 25% water for grinding, making 3.5 tons of solution, the solution would contain 4.3 pounds of copper per ton. This dilution is practically negligible so far as the process is concerned, and entirely negligible if the copper is to be chemically precipitated from the solution. Under these conditions, the soluble copper in the 500 pounds of oversize from the classifier would contain about 0.22 pound of copper, without washing, and if slightly washed, about 0.1 pound, per ton of ore. This amount of soluble copper, like the corresponding amount of free acid, can be taken care of at an expense which is practically negligible. The loss of the small amount of acid, neutralized with lime or iron, is no greater than if the copper is precipitated by any of the usual processes. The copper, if precipitated with lime as the hydroxide, is easily redissolved, and as it amounts to only about 0.1 pound per ton of ore, it does not amount to much in any case. If the copper in the leach solution is to be precipitated chemically, dilution of the solution is not of much importance and it may be an advantage, so that the oversize can be washed with water to any extent desired. This also applies to the acid leached ore or tailing, but it is believed to be better to add lime and a sulphide reagent to the leached and partly washed residue than to go to extremes in washing to remove the relatively small amount of soluble copper.

If the copper from the leach solution is to be precipitated chemically with the regeneration of acid, as with hydrogen sulphide, and the acid solution is to be reused, the dilution of the copper solution with excessive washwater should be avoided.

If the copper in the leach solution is to be precipitated electrolytically, as the preferred method, it might be desirable to carry a higher copper content in the head leach solution, or say, about 0.5% copper. This would probably bring the soluble copper content in the classifier oversize to about 0.2 pound, per ton of ore. It is preferred, for the purpose of this process, to precipitate the copper from the richer copper solution from leaching the oxidized copper by electrolysis, and the lean washwaters or waste foul solutions with hydrogen sulphide.

It will be seen that by this method of operation, 75% of the ore is ground wet to the desired fineness for floation, the same as in all wet grinding mills in extensive use, with water, and without any complications whatever. Such small departure as there is from this simple practice is confined to the regrinding mill. With a small amount of care and at practically no expense in washing the oversize, or in rendering it harmless, as described, the regrinding is exactly the same as any other wet grinding in a rod mill, and all of the ground ore will be classified to the assumed desired 48 mesh, while being leached at the same time to extract the copper in its oxide combinations in the ore. The fineness of the grinding and the classification will depend largely or entirely on the desired fineness for effective flotation of the sulphide minerals after leaching, as desired, and it is one of the objects of this process to grind and to classify the ore in one operation for effective leaching and effective flotation. Should regrinding be desired, either for mixing the flotation agents or for other reasons, it may be done in the mixer, preparatory to flotation. The mixer in that case will be a regrinder.

Leaching, when grinding to the fineness ordinarily required for effective flotation, can be made very simple, very quick, and very complete. The agitation of fine material is simple and cheap as compared with the agitation of coarse material, and the regrinding of the leached and washed coarse material makes additional expense and complication.

While the larger part of the oxidized copper will be extracted quickly in the classifier, which also acts as an agitator, it will ordinarily be desirable and usually necessary to further agitate the acid pulp in separate agitators, such as Pachuca tanks, until the desired extraction of the oxidized copper has been obtained. The time of agitation in the agitators will usually be very short, unless the ore contains a large amount of difficulty soluble copper silicate.

When the acid pulp has been given the desired treatment in the agitator, it is flowed into separator No. 1, where the copper solution is separated from the insoluble residue or tailing. It is quite practical to dewater down to about 50% of the weight of the ore in ordinary separators used for this purpose. If the solution is unwashed the residue, per ton, with 50% water or solution, will contain about 2.5 pounds of acid and about 0.5 pound of copper. If this is slightly washed, say, so as to displace half of the residual solution with water, the residue should contain, per ton, about 1.25 pounds of acid and 0.25 pound of soluble copper, and the solution would be equal in volume to that issuing from the classifier, and the only appreciable amount of water added, would be that added to the rod mill for grinding. The unwashed residue flows from separator No. 1 to separator No. 2, where it can be washed to any extent desired. It can be completely washed, if desired, and the washwater can be treated to precipitate the copper chemically in the copper precipitator. It is difficult and expensive to completely wash the soluble copper from the acid leached residue, and it would necessitate a fairly large washing and precipitation plant to take care of the large amount of very dilute washwater. It is preferred therefore to avoid or to minimize the washwater difficulty and to precipitate the residual copper in the leached residue as the sulphide, and then to float the precipitated copper sulphide with the naturally occurring sulphide in the ore. Precipitated copper sulphide is extremely easy to float, and by precipitating the small portion of the soluble copper in the leached residue, washing will be avoided, and it will not cost any more and probably less to precipitate the small amount of copper in the residue than to precipitate it from a large amount of washwater, neither will it add any extra expense to the flotation treatment of the ore subsequent to leaching.

The copper solution from the separator No. 1 flows into the lean copper solution settling tank. This solution will be about equal in amount to that flowing from the classifier. The lean copper solution as it flows from the separator No. 1 need not be clear. If the solution settling tank is made amply large the settled solution will be abundantly clear for the electrolytic deposition of the copper. The settled slime may be transferred, from time to time, from the solution settling tank to the separator No. 1 and treated and wasted with the leached residue.

The lean copper solution, which may be assumed as containing about 0.3% copper, flows from the copper solution tank into the $SO_2$ reducer No. 3, where ferric iron is reduced to the ferrous condition, with the simultaneous regeneration of an equivalent of acid. The reduced solution then flows into copper tanks No. 3, where a portion of the copper is deposited and acid and ferric iron are regenerated. A portion of the electrolyzed solution is returned to the $SO_2$ reducer No. 3, to reduce ferric iron formed by the electrolysis to the harmless or beneficial ferrous iron, and the cycle is repeated until the solution is impoverished to about 0.2% copper. A portion of the solution may be returned to the classifier if desired, and a portion—the advance flow—flows into the $SO_2$ reducer No. 4, where the ferric iron is reduced, and the reduced solution then flows into the copper tanks No. 4, where more copper is deposited and acid and ferric iron regenerated, and the cycle repeated until the solution is impoverished down to about 0.10% copper, and preferably less. A portion of the solution is returned to the classifier to pass through another complete cycle.

Since the regenerated acid solution is diluted about one eighth by the water added in the rod mill, about one eighth of the dilute acid solution from copper tanks No. 4 will have to be discarded, and this will probably be necessary in most cases for other reasons also, if the ore contains considerable amounts of iron, aluminum, or other soluble impurities. With a low current density, and operating under the conditions of this process, it will be practical to impoverish the discarded solution to less than 0.10% copper. But assuming that the effluent solution from copper tanks No. 4 contains about 0.10% copper, and that one eighth of it is diverted for chemical precipitation, it will be seen that only about ½ pound of copper would have to be precipitated chemically from the lean copper solution, per ton of ore treated, and it is highly probable that this could be economically kept down to as low as ¼ pound, per ton of ore treated. Since, under the conditions of this process, in which the ferric iron can be maintained almost completely reduced, a high current efficiency is practical even from such a lean copper solution, and it should be practical to get from 1.0 to 1.25 pounds of copper per kw.-hr., when depositing from 0.3% copper down to 0.10%, with a relatively low current density.

If it is desired to enrich the head solution in copper for electrolysis, a portion of the solution, with some free acid, may be returned from separator No. 1 to the agitator.

The discarded electrolyzed solution flows into the $H_2S$ precipitator, where the copper is precipitated, and then into the CuS separator, where the CuS is separated from the barren solution, and the barren solution is wasted.

If the leached residue in separator No. 2 is to be washed more or less completely with water, the very lean washwater may be circulated through the copper precipitator and back to the separator, but, as already indicated, it is preferred to give the residue only a slight washing, so that the volume of copper solution from the separator No. 1 will be equal to that coming from the classifier or from the agitator. Under these conditions, the copper leached residue, per ton, would contain about 1.25 pounds of acid and about 0.25 pound of soluble copper.

The residue is diluted with water to give the desired pulp fluidity for effective flotation. A precipitation agent, preferably a sulphide, such as hydrogen, calcium, or sodium sulphide, is applied to the residue to precipitate the copper. If the flotation is to be done in an alkaline circuit, lime may be added to neutralize the acid. The flotation agents are added to the pulp and the whole thoroughly mixed in the mixer. If desired, the mixer may be a regrinding machine, but it will usually be best to grind to the desired fineness for flotation in the rod mill and in the regrinding mill for the oversize. The copper leached residue, properly prepared for flotation, is treated in the concentrator to separate the sulphide precipitate and the natural sulphides in the ore by flotation, or by flotation and gravity concentration combined. If the concentrator tailing does not contain recoverable values in the precious metals, the barren tailing is wasted. If it contains precious metals in recoverable amounts, it is transferred to the precious metal leaching tank, where the precious metals can be extracted by any of the well known methods, such as cyanidation or chlorination.

One of the outstanding difficulties in the treatment of copper concentrate by roasting, leaching, and electrolysis, is to roast the concentrate so as to get an extraction of the copper by leaching comparable to that obtainable by smelting. Ferrites and ferrates are formed in roasting, and when these compounds are formed to a considerable extent, it is difficult, and usually impractical, to get a high extraction of the copper. By special roasting, or by extremely careful roasting under ordinary conditions, the ferrite and ferrate trouble can be minimized, but the results are more or less unreliable, and a factor of safety, in any case, should be provided in commercial operations. It is therefore preferred to separate the concentrate so as to obtain a relatively large amount of low grade concentrate and a relatively small amount of high grade concentrate. It is immaterial how this separation is made.

If the ratio of concentration of leached residue is 20 into 1, 95 tons of the residue would be wasted, as usual in ordinary flotation or gravity concentration. The sulphides would be recovered as about five tons of concentrate.

The copper leached and flotation tailing residue would contain very little copper and the extraction would ordinarily be almost complete, for the reason that the surface of the sulphides in the copper leached residue would be completely exposed, and the flotation effect would be at its maximum. This is one of the advantages of the present process as compared with leaching after flotation. In mixed ore a sulphide particle may be, and usually is, enclosed or coated with oxidized copper, such as the oxide, carbonate, or silicate. The sulphide particle, so enclosed or coated, is difficult to float, and the extraction of the sulphide copper will be correspondingly low. The sulphide remaining in the flotation tailing with the oxides, is not recovered by subsequent acid leaching to extract the oxidized copper, but remains undissolved and is lost. It is true that the abrasive effect of grinding has a tendency to remove the oxide coating from the sulphide particles, but this is never as complete as it is in leaching.

In the concentration treatment of the copper leached residue, either by gravity or flotation, a certain amount of very high grade concentrate may usually be separated from the large amount of ordinary sulphide concentrate, but the relatively small amount of very high grade concentrate will contain a relatively large portion of the total copper. Usually this relatively small amount of high grade concentrate will be in the form of the practically pure minerals, chalcocite, bornite, and chalcopyrite. Pure chalcocite contains 79.8% copper and 20.2% sulphur; pure bornite contains 55.8% copper, 28.6% sulphur, and 16.36% iron; pure chalcopyrite contains 34.6% copper, 24.9% sulphur, and 30.5% iron.

The five tons of concentrate, assuming 0.75% recoverable sulphide copper per ton of original ore, if mixed, would assay 15% copper and contain 1500 pounds of copper. If the copper concentrate is separated into a high grade and a low grade concentrate, it should be practical, under most conditions, to make a separation so as to get 0.75 ton of high grade concentrate, 50% copper, 750 pounds total.

4.25 tons of low grade concentrate, 8.8% copper, 750 pounds total.

There should not be any difficulty in getting a 50% copper concentrate in the relatively small amounts indicated, if much of the copper in the ore is in the form of chalcocite, and this is frequently the case in what are known as porphyry or disseminated deposits. It will be understood, however, that the process is not particularly limited to the percentage of copper in the high grade concentrate, but that the higher the grade of the high grade concentrate, the better the process can be operated as a whole.

The relatively small amount of high grade concentrate, which according to the specific case assumed for illustration purposes will consist of 0.75 tons of 50% copper concentrate per 100 tons of original ore, is roasted so as to make as much as practical of the copper water soluble and a very high percentage acid soluble. By careful roasting, from 80% to 85% of the copper can be made water soluble and from 90% to 98% can be made acid soluble.

When copper ore or concentrate is roasted so as to make a large portion of the copper water soluble, some iron is also made soluble, but the amount of water soluble iron is small as compared with the acid soluble iron.

The roasted high grade concentrate is transferred to the leaching tank No. 1, where it is leached, preferably first with water or a practically neutral copper solution, and then with dilute acid, altho the acid leach may at times be dispensed with to advantage, especially when the water soluble copper is exceptionally high.

The roasted high grade concentrate is leached with water or with very dilute acid solution, which will extract from 80% to 85% of the copper, most of which is water soluble. The resulting copper solution will be quite pure, altho it will contain small amounts of iron and other impurities, but not in sufficient amounts to seriously affect the subsequent electro deposition of the copper.

The copper solution flows from the leaching tank No. 1 to the $SO_2$ reducer, and from the reducer to the copper tanks No. 1, where the copper is deposited as electrolytic copper of great purity, with the simultaneous regeneration of acid. The $SO_2$ reducer may not be necessary, but the operation is under better control by its use. Owing to the small amount of injurious impurities in the electrolyte, the solution can be fairly impoverished in copper and regenerated in acid. The impoverished solution, low in copper and relatively high in acid, may then be transferred to the low grade concentrate leaching and electrolytic circuit. A portion of it may be returned to the roasted high grade concentrate leaching tank No. 1, to extract acid soluble copper. If the solution issues from the leaching tank No. 1, containing, say 8% or 10% copper, and containing only a small amount of iron, it is quite practical to impoverish the solution down to about 2% copper, with a very high ampere efficiency.

The relatively large amount of low grade concentrate, which according to the specific case assumed for illustration purposes will consist of 4.25 tons of 8.8% copper concentrate per 100 tons of original ore, is roasted so as to make as much copper water soluble as practical, and a high percentage soluble in dilute acid. From 75% to 85% of the copper can be made water soluble by careful roasting, and from 90% to 98% can be made acid soluble.

The roasted low grade concentrate is, preferably, first leached with water or with a very dilute acid solution, in leaching tank No. 2, to extract the water soluble copper, and the rich water soluble copper solution is flowed into the high grade concentrate leaching and electrolytic circuit, preferably by applying it to the roasted high grade concentrate. The water soluble copper solution will be practically neutral and contain very little iron, as described for the high grade concentrate. If, however, there should be more iron in the water soluble copper solution than desired, the iron will be largely precipitated when the solution is applied to the roasted high grade concentrate. The water soluble copper solution from the low grade concentrate, transferred to the high grade concentrate leaching and electrolytic circuit, by using it as the leach solution for the roasted high grade concentrate, will give a very rich and a quite pure neutral or nearly neutral copper sulphate solution, and the amount of water used will be reduced to a minimum. With care in leaching, most of the iron may be precipitated from the water soluble copper solution with the roasted high grade concentrate, and when the roasted high grade concentrate leached residue is reroasted, the precipitated iron will be made insoluble. The water soluble copper solution obtained by first leaching the roasted low grade concentrate and then the roasted high grade concentrate, is then electrolyzed to deposit the copper and regenerate acid, as described for the copper sulphate solution obtained from leaching the high grade concentrate. Copper sulphate is quite soluble in water. At 70 deg. C., which would be a fair temperature of the water in leaching hot roasted concentrate, a water saturated solution of copper sulphate will contain about 12.93% copper, and there should be no difficulty in keeping the head solution for copper deposition at from 8% to 10% copper, in leaching the roasted concentrate as described. Such a rich copper solution is not necessary, nor may it be desired, but it is obtainable if desired. The current efficiency in the deposition of the copper from the copper solution obtained from leaching the roasted concentrate as described should closely approach the theoretical, and it should be quite practical to get about 1.4 pounds of copper per kilowatt-hour, in commercial operation.

The regenerated acid solution, resulting from the deposition of the copper from the relatively pure water soluble copper solution, is quite free from injurious impurities. A portion of this acid solution may be added to the water, for the water soluble copper solution, in amount so that the acid will be quickly neutralized by the copper in the roasted concentrate which is insoluble in water. This acid soluble copper will be mostly in the form of oxide. Iron is not readily soluble in a weak acid solution, but, at the same time, the copper oxide in the roasted concentrate will be quickly dissolved in a very weak acid solution. It is practical, therefore, to leach out the larger portion of the readily soluble oxide of copper with a very weak acid solution, without appreciably increasing the iron content of the solution, and, as already indicated, if the iron occurs in the solution in undesirable amounts, it can be precipitated from the neutral solution with an excess of concentrated copper oxide. The precipitated iron in the leached high grade concentrate residue can be made insoluble by roasting the residue with the low grade concentrate. It should be practical, in this way to extract 80% of the copper from the roasted low grade concentrate and from 90% to 95% of the copper from the roasted high grade concentrate, with the water soluble copper, without appreciably fouling the solution.

After the roasted low grade concentrate has been leached with water or very dilute acid to extract the water soluble copper, it is leached with the regenerated acid solution obtained from depositing the copper from the water soluble copper solution. This strong acid copper solution will usually be quite impure. It will contain the relatively small amount of impurity from the water soluble copper leaching and electrolytic circuit, and the relatively large amount of impurity resulting from leaching the roasted low grade concentrate with the dilute acid solution to extract the acid soluble copper. The dilute acid solution will dissolve the copper in the roasted low grade concentrate which was not soluble in water, or in very dilute acid, and if the total extraction is from 95% to 97%, the leached roasted low grade concentrate residue will contain from 0.25% to 0.45% copper, which would represent a satisfactory extraction. It is preferred to leach the high grade concentrate with acid, after water leaching, and transferring the acid leach copper solution from the high grade concentrate to the low grade concentrate leaching and electrolytic circuit.

The impure solution from acid leaching the low grade concentrate, containing salts of iron and other impurities, flows into the settler or CuS reducer, where it may be clarified and treated with copper sulphide to reduce ferric iron to ferrous iron. The reduced solution then flows into the copper tanks No. 2, where copper is deposited and acid and ferric iron are regenerated. A portion of the solution is returned to the roasted low grade concentrate and the cycle repeated until the copper in the roasted low grade concentrate is sufficiently extracted, as described more in detail in my Patent No. 1,483,056, Feb. 5, 1924, and another portion—the excess—is used to leach the copper in oxidized form, such as the oxide, carbonate, or silicate from the original ore, as described.

After leaching the roasted high grade concentrate and the roasted low grade concentrate to extract the water soluble copper and depositing the copper from the relatively pure copper solution as the electrolytic metal of exceptional purity, it is preferred to leach the high grade concentrate with the regenerated acid solution to extract the acid soluble copper. The acid solution will also dissolve much or most of the precipitated or hydrolyzed iron in the concentrate resulting from leaching the water soluble copper, and hence the acid soluble copper solution will contain a considerable amount of impurities. The principal impurity will ordinarily be iron. The impure acid copper solution from leaching the high grade concentrate is then used to leach the roasted low grade concentrate residue, after leaching the roasted low grade concentrate to extract the water soluble copper. The impure acid solution will extract the acid soluble copper from the low grade concentrate, as also acid soluble impurities, principally iron. This solution, containing salts of iron preferably in considerable amounts, is then electrolyzed in the copper tanks No. 2, in the low grade concentrate leaching and electrolytic circuit.

In the deposition of the copper, acid and ferric iron are regenerated. Their relative amounts will depend mostly on the composition of the anode, the amount of ferrous salts in the electrolyte, and the temperature of the electrolyte. Either sulphur dioxide, copper sulphide, or precipitated metallic copper may be used in reducing the ferric iron produced by the deposition of the copper, in copper tanks No. 2, to the ferrous condition. Copper sulphide is preferred. The copper sulphide will usually consist, in part at least, of the precipitate obtained from precipitating the copper from the waste foul solutions and lean washwaters, with hydrogen sulphide or some other sulphide precipitation agent. If the copper in the ore is largely in the form of chalcocite, the chalcocite may also be conveniently used for reduction purposes, the same as the precipitated copper sulphide.

Under these conditions, with effective copper sulphide reduction of the ferric iron, a very high current efficiency can be obtained in the deposition of the copper, ranging from 1.25 pounds to 1.4 pounds per kilowatt-hour, from the foul copper solution in the low grade concentrate leaching and electrolytic circuit, and the copper will be obtained as the practically pure electrolytic metal. If the solution is kept warm or hot, a very large portion of the copper may be dissolved from the copper sulphide in the CuS reducer, whether the copper sulphide is the chalcocite or the precipitate. If the copper sulphide is the chalcocite concentrate, most of the copper can be extracted from the chalcocite without any preliminary treatment such as roasting or smelting, and the loss of copper will be correspondingly reduced. The iron in the foul solution is not harmful, and as used in this process, is highly beneficial.

The copper sulphide leached residue is transferred from the reducer either to the high grade or the low grade concentrate roasting furnace, and roasted with the concentrate, and leached with it. By such a treatment practically all of the copper of the copper sulphide can be extracted.

It will frequently be desirable to maintain the temperature of the solution in the copper concentrate leaching and electrolytic circuits above that normally due to the temperature of the atmosphere or to chemical reactions of the process. By maintaining the temperature of the solution fairly high the power required for the deposition of the copper will be diminished, and the reduction of the ferric iron will be more rapid and complete, and hence the copper of the copper sulphide in the reducer will go into solution much more readily.

The excess foul regenerated acid solution from the low grade concentrate leaching and electrolytic circuit, usually quite strong in acid and low in copper, is used to extract the copper in its oxide combinations from the ore. It will usually be desirable to add a portion of the regenerated acid solution to the classifier, and another portion, preferably undiluted, to the agitator.

The first portion of the copper solution resulting from leaching the ore, coming from the separator No. 1 may be fairly low in acid and fairly rich in copper. This first copper solution, or a portion of it, may be returned to the low grade concentrate leaching and electrolytic circuit to be used as an acid solution. The advantage of this is that ferric iron is more easily reduced in a neutral or only slightly acid solution than in a highly acid solution, and this may help to control the ferric iron in the low grade concentrate leaching and electrolytic circuit, if desired.

Under the conditions of this process, it should be practical to deposit almost all of the copper by electrolysis. Of the 15 pounds of extractable copper in oxide form and the 15 pounds in the sulphide form, in the original ore, assumed for illustration purposes, 28 pounds can be deposited electrolytically, and the other two pounds would be precipitated chemically. In the operation of the process, about 2.5 pounds of acid can be regenerated per pound of copper deposited. 70 pounds of acid would therefore be produced in the deposition of the 28 pounds of copper. The 15 pounds of oxidized copper in the ore, and, say, 5 pounds of acid soluble copper in the roasted concentrate, or 20 pounds in all, of acid soluble copper, per ton of ore, would require about 1.5 pounds of acid, per pound of copper, theoretically, to bring the copper in solution. As the amount of acid regenerated would amount to about 3.5 pounds, per pound of acid soluble copper, and the acid required to bring the acid soluble copper into solution would be about 1.5 pounds, theoretically, per pound of copper, there would be an excess of 2 pounds of acid, per pound of copper. This would largely make up for the acid necessarily wasted and that combining with the impurities in the ore, such as iron, lime, and magnesia. If this excess acid is no sufficient, other acid will have to be added, usually in concentrated form, and in that form it is preferably added to the agitator. Ordinarily two pounds of excess acid per pound of copper will be sufficient, or nearly so. If excess acid is not conveniently available, the deficiency may be made up by the application of sulphur dioxide from the roasting furnace to the finely ground ore in the agitator or in the classifier, as set forth in my Patent No. 1,614,669, Jan. 18, 1927. Sulphur dioxide is not very effective in getting close extraction in the treatment of copper ores. It is effective in dissolving a very large portion of the easily soluble copper from its oxidized mineralogical combinations. The more difficultly extractable acid soluble copper would be extracted with the regenerated acid solution.

It is preferred, as previously stated, to leach the water soluble copper leached high grade concentrate residue with regenerated acid solution to extract the acid soluble copper. In treating a high grade concentrate, such as that assumed, say 50% copper, an appreciable amount of copper will usually be left in the residue, even though the extraction is fairly high. Instead of making an extraordinary effort to leach this residue to get a very close extraction, it is preferred to reroast the leached high grade concentrate residue, preferably by mixing it with the low grade concentrate. Washing of the residue will not be necessary, and may not be desirable. If this acid leached residue is reroasted with the low grade concentrate, a very high extraction of the copper can be obtained, as set forth in some detail in my Patent No. 1,468,806, Sept. 25, 1923. If, for example, the extraction of the copper in the high grade concentrate is 95%, with a quick acid leach and without washing, the residue will still contain 6.25% copper, assuming a shrinkage of 60% in weight from the original high grade concentrate. This residue is added to the raw low grade concentrate and roasted and leached with it, at very small extra expense.

In the treatment of the low grade concentrate acid leached residue, it is preferred to transfer the residue, either unwashed or but slightly washed, to the finely ground ore, in separator No. 1, where it is washed with the finely ground leached oxidized ore at very small expense. It is treated with the leached ore residue by flotation. In roasted ore there is frequently some undecomposed sulphide, this sulphide would be recovered by the flotation treatment, and would pass through another cycle. Its amount would be very small in any case, but the treatment would always act as a factor of safety in making a high recovery of the copper from the concentrate.

It will be observed that by this method of procedure there is no elaborate installation for washing the concentrate residue, and that there is no special precipitation of the copper from the washwater in the treatment of either the high grade or the low grade concentrate. This is a decided advantage over separate washing of the concentrate residue and the leached finely ground ore.

While wet initial grinding in the rod mill is preferred, if it is desired to conserve water or to maintain the acid and soluble copper content in the solution as high as possible, the ore can be given an initial dry fine grinding, followed by classification in an acid solution, and the oversize can then be reground wet in the regrinding mill. This would avoid screening of the dry finely ground ore.

Under many conditions, especially in large installations, there is an advantage in separately grinding the oversize. About 75% of the ore can be ground to the desired fineness in the rod mill the same as in all ordinary grinding, if the oversize is not returned to the initial rod mill. If the oversize is reground in a separate mill, any variations from ordinary grinding will be confined to only about 25% of the ore.

Washing of leached residue to remove all of the acid or soluble copper is necessarily a prolonged operation, for the reason that in washing there is always more or less mixing of solution and washwater and between successive applications of washwater. As already indicated, about 86% of the copper solution can be removed from the leached ore residue without any washing. A slight washing would remove most of the remaining soluble copper. The small amount of copper which it is difficult to remove completely, could be completely precipitated in the residue and recovered by flotation. The copper solution can be electrolyzed to deposit the copper and regenerate acid, which is used cyclically in the process. The richer washwater could be sent to the copper precipitator, if for any reason it is desired to avoid a large amount of precipitated copper in the leached residue. Precipitated copper sulphide is easily floated; in fact in the presence of suitable flotation agents it is difficult to sink. Nevertheless, if the copper solution is fairly rich, it may be an advantage to remove some of the soluble copper in the wash water, rather than to precipitate all of the soluble copper in the residue after copper leaching.

It is preferred to return the regenerated acid solution, or a portion of it, resulting from the deposition of the copper from leaching the oxidized ore to the classifier, and to add the strong acid solution, or a portion of it, either as obtained from treating the concentrate or otherwise, to the agitators. This will avoid excessive acidity in the classifier, and economize acid. Similarly, if it is desired to build up the copper content of the solution for electrolysis, in leaching the oxidized ore, a portion of the copper solution from the settler may be returned to the classifier or to the agitator.

It is preferred to confine the wasting of electrolyzed solution to the leaching of the oxidized or mixed ore. The excess acid from leaching the high grade concentrate is preferably used in leaching the roasted low grade concentrate, and the excess acid from leaching the low grade concentrate is used to leach the oxidized copper of the ore, and, as this solution becomes foul or accumulates in excess, due to cyclic leaching and electrolysis, it is preferred to withdraw or bleed a certain amount of the solution flowing from copper tanks No. 4, and subject it to sulphur dioxide reduction and then strip the solution of copper by electrolysis to the economic limit, which may be as low as 0.05% copper, with a low current density and a highly reduced solution. The copper in this waste solution is then completely precipitated chemically, preferably with hydrogen sulphide, and the solution wasted. The CuS precipitate may be added to the CuS reducer of the low grade concentrate leaching and electrolytic circuit, to be redissolved and converted into the electrolytic metal.

The impure copper cathodes from the copper stripping tanks, or from copper tanks No. 4, may be transferred to copper tanks No. 1, of the high grade concentrate leaching and electrolytic circuit, as anodes, and refined in the relatively pure copper sulphate solution resulting from leaching the high grade concentrate. If this is done part of the solution in copper tanks No. 1 will be deposited with insoluble anodes, such as lead anodes, and part from the soluble impure copper anodes.

I claim:

1. A process of treating mixed oxide and sulphide copper ore comprising, leaching the ore with an acid solution to extract the copper in its oxide combinations, subjecting the leached residue to flotation or gravity concentration to recover the copper in its sulphide combinations as a sulphide concentrate, roasting the concentrate, leaching the roasted concentrate to extract the copper, adding the copper leached concentrate residue to the copper leached ore residue, subjecting the mixture to flotation or gravity concentration, and repeating the cycle.

2. A process of treating mixed oxide and sulphide copper ore comprising, leaching the ore with an acid solution to extract the oxidized copper, subjecting the leached ore residue to flotation or gravity concentration to separate a sulphide concentrate, roasting the concentrate, leaching the roasted concentrate to extract the copper, adding the copper leached concentrate residue to the copper leached ore residue, and washing the mixed residue.

3. A process comprising, treating copper ore by flotation or gravity concentration to separate a sulphide concentrate, leaching oxidized copper ore or concentrator tailing to extract the oxidized copper, roasting the sulphide concentrate, leaching the roasted concentrate to extract the copper, mixing the copper leached concentrate residue with the copper leached ore or concentrator tailing residue, and treating the mixed residue to recover residual copper or other metals.

4. A process comprising, treating copper ore by flotation or gravity concentration to separate a high grade and a low grade copper concentrate, leaching oxidized copper ore or concentrator tailing to extract the oxidized copper, roasting and leaching the high grade concentrate to extract the copper, mixing the leached high grade concentrate residue with unroasted low grade concentrate, roasting and leaching the mixture to extract the copper, mixing the copper leached concentrate residue with copper leached ore or concentrator tailing residue, and treating the mixed residue to recover residual copper or other metals.

5. A process of treating oxide and sulphide copper ores comprising, treating the sulphide ore to separate a high grade and a low grade copper concentrate, separately roasting and leaching the high grade and the low grade concentrate, separately electrolyzing the resulting copper solutions to deposit the copper and regenerate acid, applying the regenerated acid solution to ores to extract the copper naturally occurring in its oxidized combinations, and separately electrolyzing the resulting copper solution to deposit the copper.

6. A process of treating oxide and sulphide copper ores comprising, treating the sulphide ore to separate a sulphide concentrate, roasting the concentrate, leaching the roasted concentrate to extract a portion of the copper as a relatively pure copper solution and another portion as a relatively impure copper solution, separately electrolyzing the relatively pure and relatively impure copper solutions to deposit the copper and regenerate acid, applying the regenerated acid solution to ores to extract the copper naturally occurring in its oxidized combinations, and separately electrolyzing the resulting copper solution to deposit the copper.

7. A process of extracting copper from oxide and sulphide ores comprising, treating the sulphide ore to separate a sulphide concentrate, roasting the concentrate, leaching the roasted concentrate to extract a portion of the copper as a relatively pure copper solution and another portion as a relatively impure copper solution, separately electrolyzing the relatively pure copper solution to deposit the copper and regenerate acid, applying the regenerated acid solution to ores to extract the copper naturally occurring in its oxidized combinations, and separately electrolyzing the resulting copper solution to deposit the copper.

8. A process of extracting copper from oxide and sulphide ore comprising, treating the ore to separate a sulphide concentrate, roasting the concentrate, leaching the roasted concentrate to extract a portion of the copper as a relatively pure copper solution and another portion as a relatively impure copper solution, separately electrolyzing the pure and the impure copper solutions to deposit the copper and regenerate acid, and dissolving oxidized copper from the ore in its naturally oxidized combinations with the regenerated acid solution.

9. A process of extracting copper from mixed oxide and sulphide ore comprising, treating the ore to separate a sulphide concentrate, roasting the concentrate, leaching the roasted concentrate to extract a portion of the copper as a relatively pure copper solution and another portion as a relatively impure copper solution, electrolyzing the relatively pure copper solution to deposit the copper and regenerate acid, applying the regenerated acid solution to the ore to extract the copper therefrom in its oxidized combinations, and separately electrolyzing the resulting copper solution to deposit the copper.

10. A process comprising, leaching mixed oxide and sulphide copper ore with an acid solution to extract the oxidized copper, subjecting the leached residue to flotation or gravity concentration to separate a sulphide concentrate, roasting the concentrate, leaching the roasted concentrate with an acid solution to extract the copper, electrolyzing the copper solution to deposit the copper and regenerate acid, applying the regenerated acid solution to the mixed oxide and sulphide ore to extract the oxidized copper, electrolyzing the resulting solution to deposit the copper, mixing the leached concentrate residue with the leached mixed ore residue, and subjecting the mixture to flotation or gravity concentration to separate a sulphide concentrate.

11. A process of treating mixed oxide and sulphide copper ore comprising, grinding the ore wet, applying acid solution to the wet ground ore to extract the copper in its oxidized combinations, subjecting the leached residue to flotation to separate a sulphide concentrate, roasting the concentrate, leaching the roasted concentrate to extract a portion of the copper as a relatively pure copper solution and another portion as a relatively impure copper solution, separately electrolyzing the relatively pure and the relatively impure copper solutions to deposit the copper and regenerate acid, applying the regenerated acid solution to the wet ground ore to extract the oxidized copper, and electrolyzing the resulting copper solution to deposit the copper.

WILLIAM E. GREENAWALT.